United States Patent [19]

van der Lely

[11] 4,284,146
[45] Aug. 18, 1981

[54] SOIL WORKING MACHINE

[76] Inventor: Cornelis van der Lely, 7, Brüschenrain, Zug, Switzerland

[21] Appl. No.: 66,761

[22] Filed: Aug. 14, 1979

[30] Foreign Application Priority Data

Aug. 21, 1978 [NL] Netherlands ..................... 7808608

[51] Int. Cl.³ .................... A01B 33/00; A01B 33/02; A01B 33/10; A01B 33/14
[52] U.S. Cl. .......................... 172/47; 172/49; 172/68; 172/117; 172/119; 172/120; 172/124; 172/555
[58] Field of Search .............. 172/117, 60, 120, 112, 172/123, 124, 103, 555, 55, 63, 68, 47, 119, 44, 805, 48, 49

[56] References Cited

U.S. PATENT DOCUMENTS

| 658,462 | 9/1900 | Perry | 172/120 X |
|---|---|---|---|
| 1,635,612 | 7/1927 | Dick et al. | 172/120 X |
| 1,973,526 | 9/1934 | Diamond | 172/555 X |
| 2,214,702 | 9/1940 | Seaman | 172/117 |
| 2,831,276 | 4/1958 | Foster | 172/805 |
| 2,836,111 | 5/1958 | Hobson | 172/120 X |
| 2,892,504 | 6/1959 | Mowbray | 172/44 |
| 3,125,166 | 3/1964 | Hines, Sr. | 172/120 |
| 3,139,144 | 6/1964 | Heeren | 172/555 X |
| 3,183,980 | 5/1965 | Howard et al. | 172/47 |
| 3,658,135 | 4/1972 | Thompson | 172/119 X |
| 3,746,101 | 7/1973 | Takata | 172/112 |
| 3,822,656 | 7/1974 | Lalor | 172/63 X |
| 3,960,219 | 6/1976 | Lely | 172/60 X |

FOREIGN PATENT DOCUMENTS 197989 5/1923 United Kingdom ............. 172/117

Primary Examiner—Paul E. Shapiro
Attorney, Agent, or Firm—Mason, Mason and Albright

[57] ABSTRACT

A soil working machine pivotably mounts at least one rotor having serrated working elements. The rotor is pivotally connected at each end to a frame beam by a pin which can be inserted into either one of two holes located one above the other. The hole chosen governs the resistance to upward pivoting of the rotor. The machine can be hitched to a tractor either with the frame beam substantially transverse of the intended direction of operative travel, or with the frame beam inclined to this direction. Each rotor has end plates that mount forward blades and the outer plate supports a gear transmission to the rear of the respective blade.

22 Claims, 6 Drawing Figures

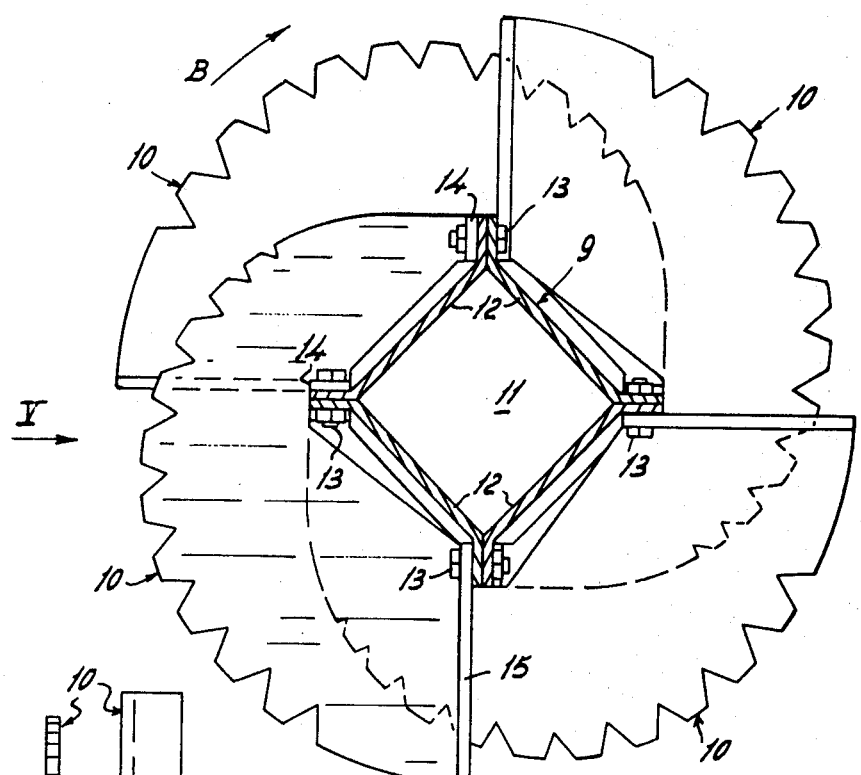
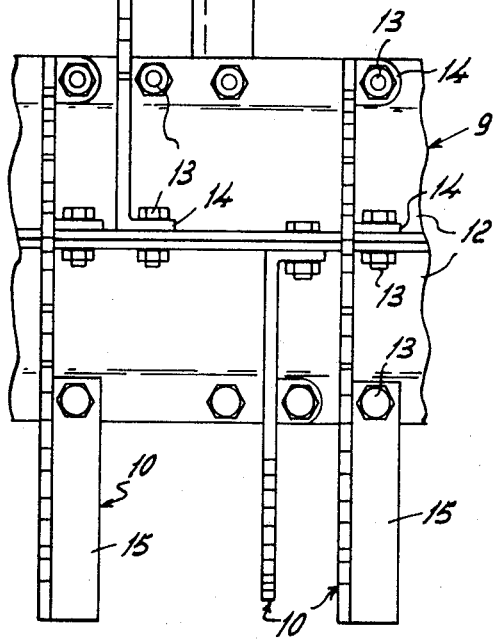

SOIL WORKING MACHINE

According to a first aspect of the present invention there is provided a soil working machine comprising a frame and a rotor connected to the frame, the rotor comprising a rotatable carrier and a plurality of working members arranged on the carrier, and being connectible to the frame for pivotal movement about either one of at least two pivotal axes.

According to a second aspect of the present invention there is provided a soil working machine comprising a frame and a rotor connected to the frame for rotation about an axis extending transversely of the intended direction of operative travel of the machine, the rotor comprising a rotatable carrier and a plurality of working members arranged on the carrier, driving gear being provided at at least one end of the rotor and a chisel or blade shaped member being provided in front of the driving gear with respect to the intended direction of operative travel of the machine.

According to a third aspect of the present invention there is provided a soil working machine comprising a frame and a rotor connected to the frame, the rotor comprising a rotatable carrier and working members arranged on the carrier, at least one of the working members being flat and having a serrated periphery.

According to a fourth aspect of the present invention there is provided a soil working machine comprising a frame and a rotor connected to the frame for rotation about an axis extending transversely of the intended direction of operative travel of the machine, the rotor comprising a rotatable carrier and a plurality of working members arranged on the carrier, the frame having means for coupling the frame to a tractor in a manner such that the rotary axis of the rotor extends obliquely to the intended direction of operative travel of the machine, the working members being flat and lying in a plane substantially perpendicular to the rotary axis of the rotor.

A construction in accordance with the present invention ensures that, during operation, the rotor can deflect, while the pressure of the rotor on the soil can be varied to match the prevailing conditions and the kind of soil.

For a better understanding of the present invention and to show how it may be carried into effect, reference will now be made, by way of example only, to the accompanying drawings, in which:

FIG. 4 is an enlarged sectional view of a carrier of the machine of FIGS. 1 to 3;

FIG. 5 is a fragmentary elevational view in the direction of the arrow V in FIG. 4.

Figure 2:
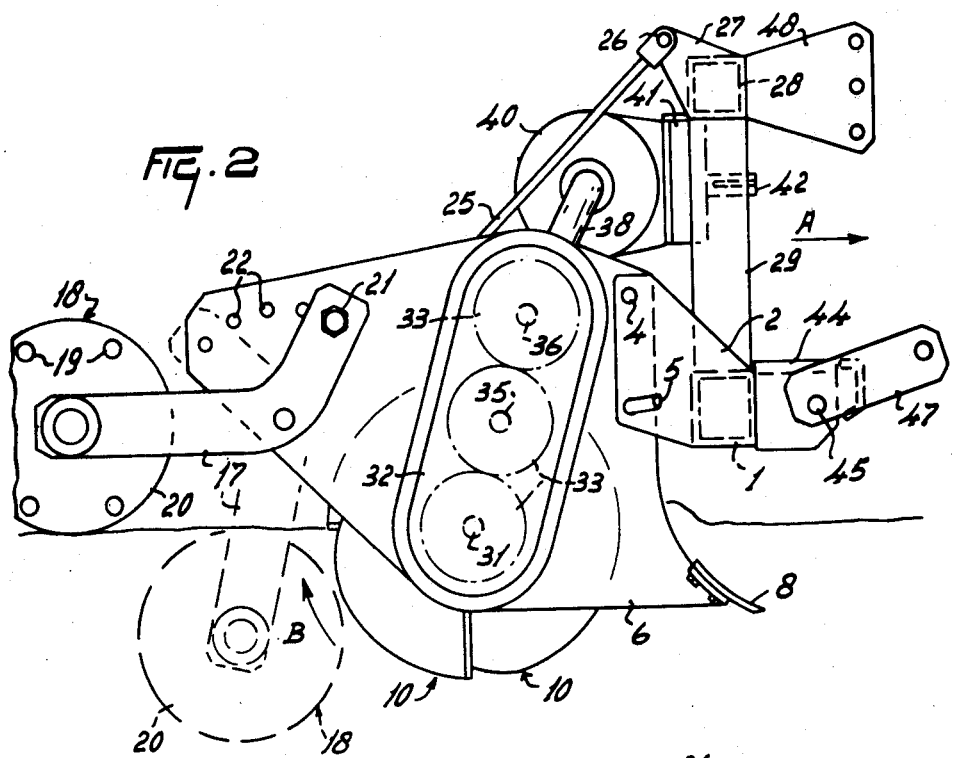
FIG. 2 is an enlarged elevational view in the direction of the arrow II in FIG. 1.

The machine illustrated in the Figures is a soil working machine comprising a frame having a substantially horizontal frame beam 1 extending transversely of the intended direction A of operative travel of the machine. The frame beam 1 is hollow and has an angular, preferably square cross-section. Near each of its ends, the frame beam 1 has two spaced plates 2 which extend from the frame beam 1 upwardly and to the rear. At the center of the frame beam 1 there are two spaced plates 3 which also extend upwardly and to the rear. The plates 2 and 3 are fastened both to the rear side and to the top side of the beam 1 and have a width which increases towards the rear. Each of the plates 2 and 3 has near its rear edge two openings 4, one near the top and the other near the bottom, for receiving a pivotal pin 5, for pivotally connecting upwardly extending plates 6 and 7 to the plates 2 and 3 at either one of two pivotal points (FIG. 2), depending on which hole 4 receives the pin 5. Each opening 4 and its pivotal pin 5 comprises a pivotal joint at the pivotal point mentioned above. Each of the plates 6 and 7 has a substantially horizontal bottom edge which meets a rear edge which is upwardly inclined from front to rear and which is connected, by short, upwardly and forwardly inclined portions, to a substantially horizontal top edge. The front edge of the plate extends from the top substantially vertically downwards and terminates in a forwardly curved portion meeting the substantially horizontal bottom edge. The front edges of the plates 6 and 7 extending perpendicularly downwards have openings corresponding with the openings 4 in the plates 2 and 3 for receiving the pivotal pin 5. A chisel or blade member 8 or 8A is releasably bolted to the forwardly extending, pointed lower end of the front edge of each plate 6 and 7 respectively. The function of the member 8 or 8A will be explained more fully later in this description.

A carrier 9 is rotatably supported between each pair of plates 6 and 7 and extends transversely of the direction A substantially parallel to the frame beam 1. It is supported by stub shafts provided at the ends of the carrier 9 and bearings arranged in bearing housings fastened to the plates. Each of the carriers 9, the aligned centerlines of which coincide with their common rotary axis, is provided with a plurality of working members 10. The carrier 9 with its working member 10 constitutes a rotor 11. Each carrier 9 is hollow and made up of four identical plates 12, the longitudinal edges of which are bent over and clamped to those of the adjacent plates by bolts 13 so that the carrier has a generally square cross-section with the clamped longitudinal edges forming radially projecting ribs extending lengthwise of the carrier parallel to its longitudinal centerline (FIG. 4). The working members 10 are fastened to the carrier 9 by the bolts 13 and the ribs formed by the longitudinal sides of the plates. Each working member 10 is punched from sheet material about 6 mms thick. The periphery of each working member, on the side array from the carrier, has a substantially involute configuration. The outer periphery of each working member 10 subtends a circumferential angle of about 180°. The leading edge of each working member, with respect to the intended direction B of operative rotation of the rotor 11, is nearer to the rotary axes of the rotor than is the trailing edge, which extends substantially tangentially with respect to the direction B (FIG. 4). Before assuming the involute form, the leading edge extends substantially tangentially away from the carrier 9. The radial width of the working member 10 is at the leading edge about 1/6 of the radial width at the trailing edge. On the inner side facing the carrier 9, each working member 10 has fastening portions which extend perpendicular to the main plane of the working member 10 and which are circumferentially spaced apart by about 90°. They are secured by the bolts 13 to the ribs formed by the longitudinal edges of the portions 12. At its trailing edge, working member 10 is secured to the carrier 9 by one end of a straight rim 15 at right angles to the plane of the working member and extending radially over the whole width of the working member. Between the fastening regions each working member 10 has a recess, the edge of which, when the working member is in place, extends between the front and the middle fastening regions substantially parallel to an adjacent one of the plates 12 of the carrier 9, and, between the middle and the rear fastening regions, converges towards an adjacent one of the plates 12. The outer periphery of each working member 10 has serrations formed by a plurality of spaced V-shaped recesses, the depth and width of which increase from the leading edge to the trailing edge and which are positioned so that a line going through the tip of the V and the point midway between the sides of the V extends substantially radially.

Viewed along the carrier 9 the consecutive working members 10 are off-set one from the next by an angle of about 90° and they overlap one another by about one third of their overall surface area. Thus, in operation, satisfactory co-operation is ensured between successive working members. The distance between adjacent working members 10 is approximately equal to the width of the rim 15 (FIG. 5). The three fastening regions, which do not lie on straight line as viewed along the carrier 9 and which are offset from one another by angles of about 90°, provide a reliable attachment of each working member 10. The diameter of the rotor 11 formed by the carrier 9 and its working members 10 is about 50 centimeters. Between each pair of plates 6 and 7, each rotor 11 is covered by a screening hood 16, which is secured to the respective plates 6 and 7. At the rear of each of the plates 6 and 7 of a pair, there are rearwardly extending arms 17, between the rear ends of which a roller 18 is freely rotatable.

Figures 1, 6:
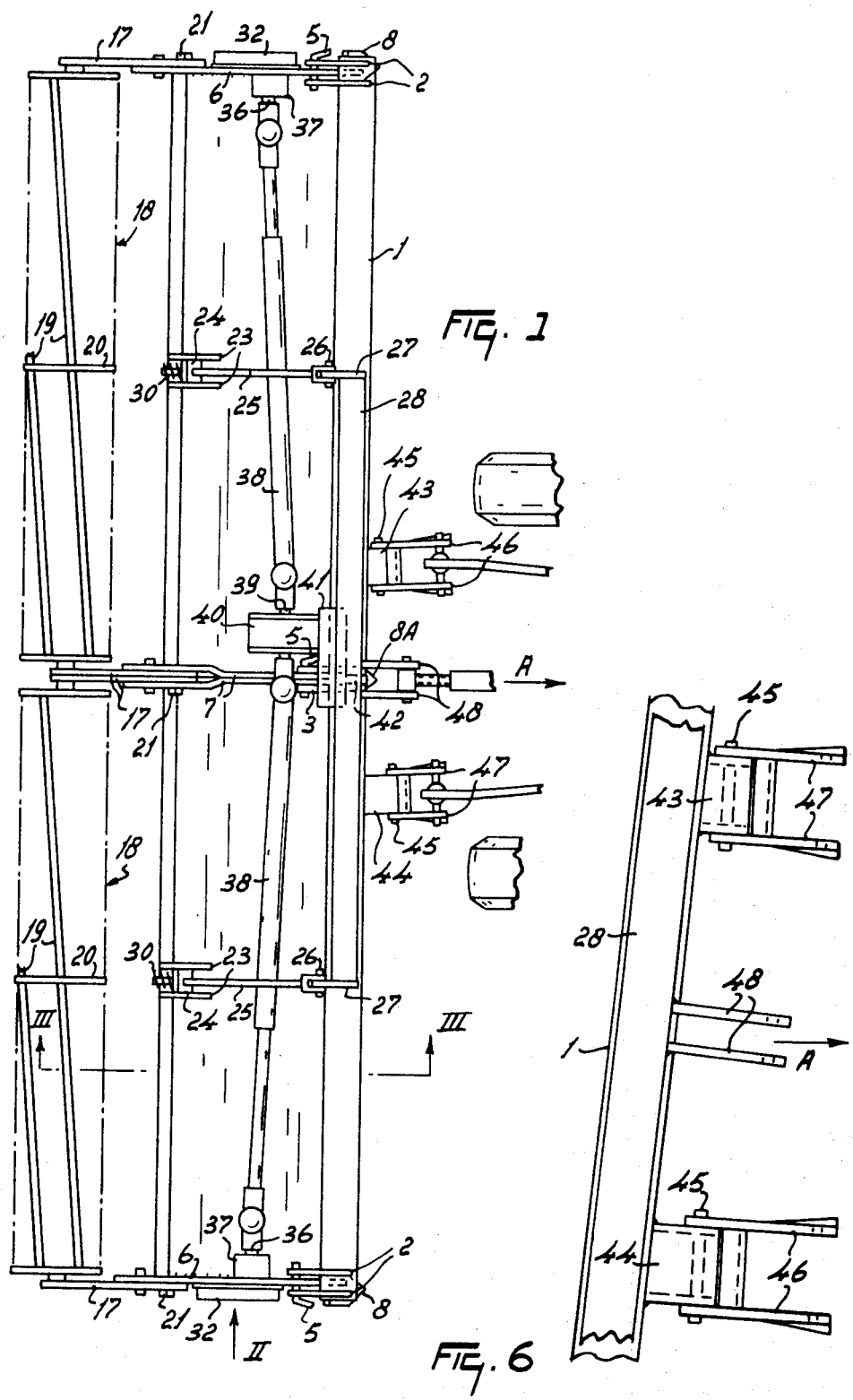
FIG. 1 is a plan view of a soil working machine.
FIG. 6 illustrates an alternative construction for coupling the machine with the three-point lifting device of a tractor.
Figure 3:
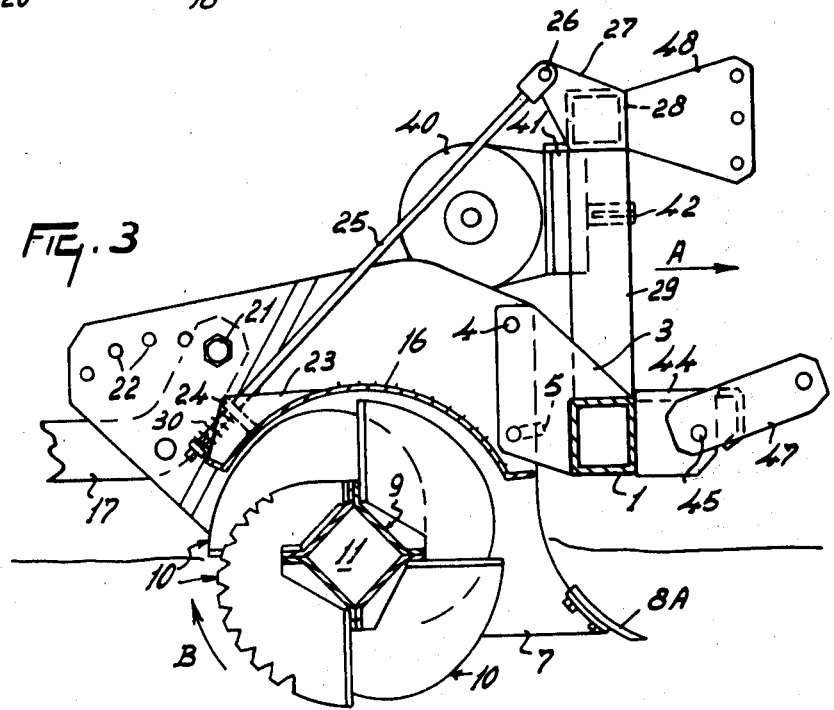
FIG. 3 is an enlarged sectional view taken on the line III—III in FIG. 1.

The roller 18 has at its circumference a plurality of helically extending elongate elements 19 extending the length of the roller, these elements 19 being supported by support plates 20. An upwardly curved part of each of the arms 17 can be fixed in any one of plurality of positions with respect to its plates 6 and 7 by means of a bolt 21 and a plurality of holes 22 in the plate, so that adjustment of the roller sets the working depth of the respective rotor 11. For transporting the machine, the roller 18 can be moved into a position in which it is as near as possible to the rotor (this position is indicated by broken lines in FIGS. 2 and 3). In order to accommodate the two adjacent arms 17 of the rollers 18, the plates 7 each have a depression at the rear so that the arms fastened to the plates are in contact with one another (FIGS. 1 and 3). Midway along each screening hood 16 there is on the rear side a pair of tags 23, between which an anchorage 24 is arranged, through which a rod 25 passes. The top end of the rod 25 is pivotally connected by a pin 26 and a tag 27 to the end of a frame beam 28 extending transversely of the direction A and located above the frame beam 1 to which it is secured by supports 29. Between the tie member 24 and a stop at the lower end of the rod 25, the rod 25 is surrounded by a compression spring so that downward movement of a rotor 11 is resiliently opposed. A stub shaft 31 arranged on the outer side of each carrier 9 extends into a casing 32 secured to the outer side of the respective plate 6. In the casing there is a spur pinion 33. The pinion 33 is drivably in mesh with an identical pinion 33 on a stub shaft 35 fastened to the plate 6, and this pinion 33 is, in turn, drivably in mesh with another identical pinion 33 on a stub shaft 36. The stub shaft 36 is supported in bearings in a bearing housing 37. One end of each stub shaft 36 projects out of the screening casing 32 and is directed inwardly, and this end is provided with splines for receiving one end of a universal joint forming part of a telescopic shaft 38. The other end of the telescopic shaft 38 is provided with another universal joint fitted on a splined end of a shaft 39 which is journalled in a gear box 40. The gear box is fastened to the underside of the beam 28. Inside the gear box 40, the shaft 39 is drivably engaged, by means of a bevel pinion transmission (not shown), with a shaft projecting from the front of the gear box. This shaft is provided with an exchangeable pinion forming part of a change-speed gear 41 located at the front of the gear box. The change-speed gear 41 has a shaft 42 which is parallel to the first-mentioned shaft and also has an exchangeable pinion for co-operation with the other exchangeable pinion. The shaft 42 can be linked by means of an auxiliary shaft to the power take-off shaft of a tractor drawing the device. At the front, at substantially equal distances from the center, the frame beam 1 is provided with forwardly and substantially horizontally extending supports 43 and 44, which are positioned (see FIG. 1) so that they extend at a small angle to the direction A. The length of the support 43 is substantially half the length of the support 44. A pin 45 releasably connects each support to a bracket 46 and 47 respectively, between the limbs of each of which is arranged the lower arm of the lifting device of a tractor. The limbs of the exchangeable bracket 46 are longer than those of the bracket 47. As shown in FIG. 1 the longer bracket 46 is arranged on the shorter support and the shorter bracket 47 on the longer support. Thus the machine is coupled to the tractor in a manner such that the rotary axis of the rotor 11 is substantially perpendicular to the direction A. If the longer bracket 46 is arranged on the longer support 44, the coupling is such that the common rotary axis of the rotors is at an angle of 5° to 10° to the direction A. Since the supports are slightly inclined to the frame beam 1, they are directed substantially to the front even in the last-mentioned position (see FIG. 6). Between the supports 43 and 44 the beam 28 is provided with two spaced plates 48 extending in the direction A. Between the plates 48 is arranged the top arm of the three-point lifting device of a tractor.

For operation, the machine is coupled in one of the positions described with the three-point lift of the tractor, using the brackets 46 and 47 and the plates 48. The power take-off shaft of the tractor, via the auxiliary shaft and through the transmission described above, drives each of the rotors 11 in the direction indicated by the arrow B in FIGS. 2 and 3. Before switching the job, each roller 11 is set to a given working depth by adjusting the roller 18. Moreover, before starting a job each rotor can be arranged at will to pivot about a high or low pivotal point by inserting the hinge pin 5 into the appropriate one of the openings 4 in the plates 2 and 3 secured to the frame beam 1. When the rotor 11 is arranged to pivot about the higher pivotal point, the resistance of the rotor to upward deflection will be greater than when the rotor is arranged to pivot about the lower pivotal point. During operation, the leading part of the outer circumference of each of the working members 10, which part extends substantially tangentially and does not have serrations, is first to penetrate into the soil, after which, due to the involute form, the working member penetrates gradually further into the soil. The serrations, having increasing depths, at the outer periphery of each of the working members 10 easily cut up vegetable remnants in the soil. The rim 15 of each working member at the trailing edge ensures a satisfactory pulverisation of the soil. During operation, as stated above, each rotor can deflect upwardly about a pivotal axis extending transversely of the direction A and located in front of the rotor at a level above the rotary axis of the rotor. This pivotal axis coincides with the longitudinal centerlines of the pivotal pins 5 so that each rotor can move up and over stones and other obstacles in the soil without being damaged. As stated above, the resistance to this movement of the rotor is greater when the hinge pin 5 is in the upper one of the openings 4. The two adjacent rotors, working an uninterrupted strip of soil, can pivot upwardly independently of one another. The upwards deflection is assisted by the counterbalancing effect of the compression spring 30.

When the machine is coupled to the lower arms of the lifting device of the tractor in the manner shown in FIG. 6, the rotary axes of the rotors 11 are at an angle of 5° to 10° to the direction A. Owing to this inclined position of the rotary axes, vegetable remnants such as straw and roots can be more readily disengaged by the working members. The chisel or blade shaped members 8 and 8A provided at the front of the plates 6 and 7 assist the penetration of the rotors into the soil by exerting a downward force on the plates supporting the rotors. Moreover, since the members 8 are at the outer sides of the plates 6 and are located in front of the driving gear in the respective casing 32, they can make a groove in the soil in front of the casings during operation.

While various features of the machines that have been described, and that are illustrated in the drawings, will be set forth in the following claims as inventive features, it is to be noted that the invention is not necessarily limited to these features and that it encompasses all of the features that have been described both individually and in various combinations.

I claim:

1. A soil working machine comprising a frame and a rotor pivotably supported on said frame, said rotor comprising soil working means on a carrier mounted for rotation about a non-vertical axis that extends generally transverse to the direction of machine travel and driving means connected to drive said rotor about said axis during operation, said rotor being connected to said frame by either one of two pairs of pivotal connections, the connections of each pair being spaced from one another in a direction transverse to the direction of machine travel and comprising pivot pins having registering pivotal axes, the respective pivotal axes coinciding with the longitudinal center lines of corresponding pins which can be inserted into openings in plate means to define said pivot connections, said plate means having a plurality of openings and said pins being insertable in any of said openings to define respective pivot connections at different level settings, whereby the resistance to upward pivotal deflection by said rotor can be changed.

2. A soil working machine as claimed in claim 1, in which said plate means comprises plates fixed to said carrier and supporting plates secured to said frame, said plates and supporting plates having openings that receive said pins to define alternative pairs of pivot connections, said openings being located in front of the rotary axis of said carrier.

3. A soil working machine as claimed in claim 2, wherein the ends of said carrier are supported by said plates, said plates extending upwardly and forwardly to pivot connections to said supporting plates.

4. A soil working machine as claimed in claim 3, in which a driving gear is connected to an outer end of said rotor and a blade shaped member on said upwardly extending plate is positioned in front of said gear.

5. A soil working machine as claimed in claim 4, in which each blade-shaped member is secured to a forwardly directed portion in the bottom region of the respective upwardly extending plate.

6. A soil working machine as claimed in claim 5, in which said forwardly directed portion is curved and merges at its upper end into a vertically extending portion and said blade-shaped member is curved to match the curve of said forwardly directed portion.

7. A soil working machine as claimed in claim 2, in which said openings are located one above the other in the supporting plates on said frame.

8. A soil working machine as claimed in claim 1, in which the pivotal connections of each pair are located adjacent the ends of said carrier.

9. A soil working machine as claimed in claim 1, in which there are two rotors arranged side-by-side to work an uninterrupted strip of soil during operation.

10. A soil working machine as claimed in claim 1, in which a spring mechanism is interconnected to said rotor and said frame to partly support the weight of said rotor.

11. A soil working machine as claimed in claim 1, in which said working means includes a plurality of members and each member has a serrated periphery.

12. A soil working machine comprising a frame and a rotor pivotably supported on said frame, said rotor comprising soil working means on a carrier mounted for rotation about a non-vertical axis that extends generally transverse to the direction of machine travel and driving means connected to drive said rotor about said axis during operation, said soil working means comprising a plurality of flat members and each member having an outer curved serrated periphery that defines the operative surface of said rotor, the said periphery of each member being curved and extending over a circumferential angle of about 180° and said curve being substantially an involute.

13. A soil working machine as claimed in claim 12, in which said outer periphery extends initially tangentially to the rotary axis of the rotor, at the leading edge of said member and adjacent a fastening between said member and the carrier.

14. A soil working machine as claimed in claim 13, in which at least part of said curve is serrated and the serrations being adjacent the transition between the tangentially extending portion and the involute.

15. A soil working machine as claimed in claim 14, in which the depth of the serrations increases from front to rear with respect to the normal direction of rotor rotation.

16. A soil working machine as claimed in claim 15, in which the serrations comprise a plurality of spaced V-shaped recesses.

17. A soil working machine as claimed in claim 13, in which the front of said frame has coupling means for connecting the machine to a tractor.

18. A soil working machine comprising a frame and a rotor pivotably supported on said frame, said rotor comprising soil working means on a carrier mounted for rotation about a non-vertical axis that extends generally transverse to the direction of machine travel and driving means connected to drive said rotor about said axis during operation, said frame having a coupling for connection to the lifting device of a tractor, said coupling including adjusting means that positions said carrier obliquely to the direction of machine travel, said soil working means comprising a plurality of flat elements that lie in a plane substantially perpendicular to the rotor axis of said carrier, said coupling comprising two coupling points for the lower arms of the lifting device and said coupling points being located at different distances from the frame, said coupling points comprising two brackets of different lengths to which lower arms of said lifting device are fitted, said brackets being replaceable one by the other and releasably connected to support members on said frame, said support members having different lengths, the total length of the shorter bracket and the longest support being substantially equal to that of the longer bracket and the shorter support.

19. A soil working machine as claimed in claim 18, in which said brackets are pivotally connected to the support members by releasable pins that have longitudinal centerlines aligned with one another.

20. A soil working machine as claimed in claim 19, in which said support members are arranged on a frame beam that extends transversely of the direction of travel at a non-perpendicular angle.

21. A soil working machine as claimed in claim 18, in which the rotary axis of said rotor is at an angle of 5°–10° to the direction of travel.

22. A soil working machine as claimed in claim 18, in which a roller is positioned to the rear of said rotor and is vertically adjustable relative to said carrier, said roller being supported by settable arms which can be positioned at different levels with respect to the rotor.

* * * * *